United States Patent
Dowdell et al.

(10) Patent No.: US 7,300,287 B2
(45) Date of Patent: Nov. 27, 2007

(54) LEARNING SYSTEM AND RELATED METHODS PARTICULARLY SUITABLE FOR AN ORGANIZATION'S SUPPLY CHAIN

(75) Inventors: Dwight Dowdell, Naperville, IL (US); Michael G. Mikurak, Gulfport, FL (US); Christopher Jepson, Chicago, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 598 days.

(21) Appl. No.: 10/653,344

(22) Filed: Sep. 3, 2003

(65) Prior Publication Data
US 2004/0132000 A1    Jul. 8, 2004

Related U.S. Application Data

(60) Provisional application No. 60/437,995, filed on Jan. 6, 2003.

(51) Int. Cl.
*G09B 19/00*    (2006.01)
(52) U.S. Cl. .......................................... 434/219; 705/11
(58) Field of Classification Search ................. 434/219, 434/350, 365, 322, 323, 307 R; 705/219
See application file for complete search history.

(56) References Cited

U.S. PATENT DOCUMENTS

| | | | |
|---|---|---|---|
| 6,029,043 A * | 2/2000 | Ho et al. ..................... | 434/350 |
| 6,189,146 B1 * | 2/2001 | Misra et al. ................. | 717/177 |
| 6,334,779 B1 * | 1/2002 | Siefert ......................... | 434/322 |
| 6,347,333 B2 * | 2/2002 | Eisendrath et al. ......... | 709/217 |
| 2001/0023059 A1 * | 9/2001 | Toki ............................ | 434/157 |
| 2001/0053513 A1 * | 12/2001 | Corn et al. .................. | 434/350 |
| 2002/0072049 A1 * | 6/2002 | Prahalad ..................... | 434/365 |
| 2002/0119435 A1 * | 8/2002 | Himmel et al. ............. | 434/350 |
| 2002/0138456 A1 * | 9/2002 | Levy et al. ................... | 706/25 |

* cited by examiner

*Primary Examiner*—Robert E. Pezzuto
*Assistant Examiner*—Cameron Saadat
(74) *Attorney, Agent, or Firm*—Hogan & Hartson LLP

(57) ABSTRACT

The invention disclosed relates to a learning system and related methods for providing training and continuing education to members of an organization's supply-chain workforce. A learning system utilizes a blended learning approach that matches various educational delivery techniques to the appropriate learning materials, time constraints, and skill level of the end user. The system is simultaneously accessible to multiple organizations in order to provide uniformity of learning among a wide variety of participants within the supply-chain workforce, while remaining adaptable to the unique learning needs of each organization. Thus, the invention captures the benefits of distance learning techniques while minimizing the isolationist learning environment typically associated with those leaning delivery methods. Furthermore, the invention seeks to capture the benefits associated with traditional learning delivery methods such as team-oriented learning and personal instructor feedback.

19 Claims, 12 Drawing Sheets

*Your@ompany Logo*

Welcome Joe

Click on arrow to expand.

▼ My Learning Assets

The Attention Economy — remove
Transportation Key Performance Indicators (KPIs) — remove
Allocation and Order Promising — remove
Fundamentals of Fulfillment — remove ▶ My Scheduled Events Announcements

Welcome to the Supply Chain Academy!
The Supply Chain Academy is a comprehensive and continuous learning environment for supply chain professionals, designed to improve your performance through a full range of supply chain knowledge and learning solutions.

Procurement Concepts gets you started
This on-demand course will get you started with the basics of Procurement and Sourcing.

Mike (Exec VP of I) Presentation Today!
        European distribution
Mike explains
strategy at 6 PM (Eastern) via audio conference this evening.
Sign up today!

Learning in Your Language!
Mandarin or Korean? Japanese or German? Spanish or Links:
www.yourcompany.com

Fig. 7

Find Learning Assets

You can search in four ways:

Text Search:
[transportation] [Go]

Show all Learning Assets alphabetically

Show what I can learn online

Choose a search criteria:
- By Month
- Training Type
- Functional Area
- Proficiency Level Choose a month:
[All Months ▼] [Go]

✈ = Premium

Supply Chain Academy

○ Home  ○ Contact Us  ○ FAQ
○ Search  ○ Program  ○ eKnowledge  ○ Speakers  ○ Series  ○ Discuss  ○ News

| Name | Hours | Training Type |
|---|---|---|
| ABC – Activity Based Costing (R2) | 2 | eLearning TBD |
| Analyzing Cost vs. Budget (R2) | 2 | eLearning TBD |
| Basic Inventory Concepts | 1 | Online Self-Study |
| Buying Transportation (R2) | 1 | eLearning TBD |
| Carrier Management | 1 | Expert On-Demand |
| Collaborative Transportation Management | 1 | Expert On-Demand |
| Contract Management (R2) | 2 | Expert On-Demand |
| Contract Process/Strategic Transportation Procurement (R2) | 2 | Online Self-Study |
| Cost/Price Minimization: Supplier Pricing Perspectives | 1 | Online Self-Study |
| Determining an Effective Management Structure (R2) | 2 | eLearning TBD |
| Documentation (R2) | 2 | Online Self-Study |
| eFulfillment | 24 | Workshop |
| Fleet Sizing/Planning/Purchase (R2) | 2 | eLearning TBD |
| Fundamentals of Fulfillment | 8 | Online Self-Study |
| Global Supply Chain Simulation -- Virtual | 40 | eCourse |
| Global Supply Chain Simulation -- Workshop | 32 | Workshop |
| How to Find Transportation Research and Information (R2) | 2 | eLearning TBD |
| Identifying and Selecting Service Providers (R2) | 2 | eLearning TBD |
| Information Technology (R2) | 2 | Expert On-Demand |
| Integration of Transportation Strategy with Supply Chain Strategy | 2 | Expert On-Demand |
| International Logistics Virtual Series | 2 | Expert Audio/Web Cor |
| Introduction to Logistics | 40 | Workshop |
| Introduction to Synchronized Supply Chain | 40 | Workshop |
| Inventory Carrying Costs Session (R2) | 2 | Expert Audio/Web Cor |

Fig. 8

Name: Global Supply Chain Simulation — Virtual
Number: ATT103 Proficiency: Intermediate - Intermediate
Hours: 40 Format: eCourse Request Enrollment

Abstract:
*Actual pricing will vary depending upon the requirements of the client.*

This is a 6-week, distance-based team simulation/competition in which participants play the role of global manufacturers that make multiple rounds of decisions regarding factors such as procurement, manufacturing, distribution/warehousing, and transportation. Participants communicate with teammates via conference call and e-mail, and a final presentation by each team concludes the course.

Activity Summary:

The following activities make up this Blended Learning Series:

Description:
A detailed description of this course is available by clicking here.

This offering is a 6-week, distance-based team simulation/competition, in which participants play the role of global manufacturers that make weekly decisions on factors such as procurement, manufacturing, distribution/warehousing, and transportation. These decisions result in financial and operational reports, which participants analyze to make future decisions. Participants also have the opportunity to go through multiple tutorials and exercises on topics such as sales forecasting and supply chain planning. A final presentation by each team concludes the course. This course is conducted entirely virtually, via conference calls and e-mails. Participants should be able to spend six hours a week on the simulation over the course of six weeks. The first week is reserved for reviewing pre-reads and the company's financial statements, as well as for talking with teammates. In the second week, participants must devote all of Monday to the course and be in a location with network internet access. For the rest of the simulation, however, participation may occur from any location.

Learning Objectives:
At the end of this course, you will be able to:

- Describe the elements of the supply chain and how they relate to one another
- Explain the need for balancing and managing tradeoffs in the supply chain
- Describe the competitive dynamics that occurs in a typical supply chain
- Explain financial statements, key performance indicators (KPIs), and metrics

Fig. 9

Supply Chain Education Program

Click the links below to:

Show all Level 1 Courses

Show all Level 2 Courses

Show all Level 3 Courses

Building Knowledge and Skills Through Education and Training To Improve Job Performance

Program Framework

The Supply Chain Academy mission is to empower professionals working in supply chain-related areas by equipping them with the education and training they need to help achieve superior supply chain performance.

Level 1: Common Foundation

| Supply Chain Analyses Tools & Techniques |
| --- |
| Supply Chain Concepts & Processes |

Level 2: Specialty Areas

| Supply Chain Planning | | | | |
| --- | --- | --- | --- | --- |
| Product Development | Procurement & Exchanges | Manufacturing | Transportation | Warehousing | Service Management & Customer Support |

| Inventory Management |
| --- |

Level 3: Leadership Skills

| World Class Supply Chain Expertise |
| --- |
| Value Creation and Realization |
| Integrated Supply Chain Management |

Next

Program Framework
A formalized and comprehensive collection of training opportunities for all personnel involved in supply chain work, with varying experience and career levels.

Level 1 Overview
Build a foundation of knowledge across the entire supply chain.

Level 2 Overview
Build deeper knowledge and skills in a given area.

Level 3 Overview
Address integration issues and solutions, value creation and leading-edge concepts.

Fig. 12

LEARNING SYSTEM AND RELATED METHODS PARTICULARLY SUITABLE FOR AN ORGANIZATION'S SUPPLY CHAIN

CROSS REFERENCE TO RELATED APPLICATIONS

The application claims the benefit of U.S. Provisional Patent Application No. 60/437,995, entitled "Learning System and Related Methods Particularly Suitable for an Organization's Supply Chain," filed Jan. 6, 2003, which is hereby incorporated by reference.

FIELD OF THE INVENTION

The present invention generally relates to education. More particularly, the invention disclosed relates to a learning system and related methods for providing training and continuing education to members of an organization's supply-chain workforce.

BACKGROUND OF THE INVENTION

Employee training and education are becoming increasingly more critical to the success of organizations within today's modern global economy. As a minimum requirement to remaining competitive, companies that operate in today's complex industries need employees who remain knowledgeable and current in areas of expertise that serve the companies' ever-evolving strategic objectives. Executives of such companies feel this need for improved learning solutions as it is brought to the forefront of their strategic objectives by various business imperatives of the competitive market.

The concept of a supply chain involves the integral management—within a company and through other companies—of various logistical stages such as materials procurement, production, storage, distribution, and customer service. Viewed as a whole, the supply chain concept encompasses numerous logistical systems from mining of raw materials to the final consumption of a good or service. The supply chain is, thus, a complex object, involving decision-makers from many different fields whose decisions may be mutually dependent upon each other.

The training needs for actors in the supply chain are simultaneously broad and uniform across various organizations. A wide breadth of educational subject matter and delivery mechanisms are required to meet the needs of participants along the many different points on the supply chain. While diverse in subject matter, the training skills are applicable and transferable across various corporate fields or product lines.

Furthermore, because the various logistical stages and processes of the supply chain are interdependent, actors in the supply chain receive collective benefit from effective training given to the other supply chain actors. To maximize the effectiveness of training in the supply chain environment, there is a need for integrated learning structures that are accessible to multiple organizations simultaneously in order to provide uniformity of learning and the benefits of synergy. At the same time, the structures must be able to be tailored to the unique learning needs of each organization. Thus, the supply chain presents a unique educational field that requires assembly of a broad range of subject matter and appropriate delivery techniques that are transferable across various organizational entities.

Companies have placed increasing emphasis on gaining competitive advantage through superior knowledge of a company's workforce. Rapid changes in technology have made new methods of learning available and more cost effective than ever before. The effectiveness of traditional approaches to employee training such as instructor-led lectures and interactive seminars is limited by such factors as the number of participants that can be accommodated, the availability of instructors, travel costs, and potential disruption of work schedules. The practice of blind reliance on traditional learning approaches has been challenged; more flexible, efficient and cost-effective means are needed.

Distance learning and computer-based training methods have been developed in an effort to meet the demand for more effective and efficient training. Communication tools such as the Internet provide developing mediums that may be used for distance learning purposes. Internet connections can provide access to an abundance of data and electronic media typically referred to as the World Wide Web ("Web") as well as various communications means that can be conducted via computer rather than traditional means such as personal conversation, telephone or mail. Use of these tools allows students to participate in learning activities such as viewing and listening to pre-recorded materials and real-time presentations. Written learning materials and testing material can also be delivered on-line.

However, use of these training techniques has brought with it new drawbacks. Computer based instruction is typically impersonal and does not accommodate group projects or team interaction. Also computer-based methods cannot typically provide the student with a means for personal exchanges with an instructor or individualized feedback. Listening or viewing a computer-based presentation does not provide a student with the benefits associated with personal interaction between the teacher and the student. Furthermore, computer-based training may not be an appropriate teaching format for some educational or skill levels within the supply-chain community.

Other distance learning methods that do not rely on computer networks involve similar drawbacks. Pre-recorded audio or video presentations do not allow for personal feedback. Student examinations may require mailing or faxing documents back and forth. Instructor feedback, if available, is delayed and typically not provided personally.

A learning system and related methods are needed that overcome the current deficiencies of traditional, distance learning and computer-based training techniques and that can make training accessible to a diverse range of participants in the supply chain.

SUMMARY OF THE INVENTION

In light of the above described and other deficiencies, the present invention relates to a learning system and related methods for providing training and continuing education to members of an organization's supply-chain workforce. Generally, the Supply Chain Learning System (SCLS) provides a full range of supply chain knowledge and learning solutions designed to improve an organization's competitive advantage by enhancing the skills and capabilities of actors both within and outside of the organization who are engaged in supply-chain related activities. The SCLS utilizes a blended learning approach that matches various educational delivery techniques to the appropriate learning material, time constraints, and skill level of the end user. Thus, the invention captures the benefits of distance learning techniques while minimizing the isolationist learning environment typically associated with those leaning delivery methods. Furthermore, the invention seeks to capture the benefits associated with traditional learning delivery methods such as team-oriented learning and personal instructor feedback.

It is an object of the present invention to provide a learning system and related methods that makes training accessible for a wide variety of skills and learning needs while minimizing time away from the workplace and lost productivity. Such a learning system incorporates distance learning tools, such as web-based communications and audio/video conferencing, with traditional learning techniques. Embodiments of the invention can structure the learning experience in discrete segments to be completed incrementally over a longer period of time than traditional seminar-type courses. A learning system according to the present invention can adapt existing traditional classroom course content into a format of discrete segments or can be used to develop new course content.

It is also an object of the present invention to provide a learning system that is simultaneously accessible to multiple organizations within a supply chain, yet adaptable to the specific needs of each organization. A learning system according to the present invention provides uniformity of training within specific subject areas that can be delivered to actors in various organizations within the supply chain. At the same time, the learning environment and available learning options can be limited or expanded to suit the needs of individual actors or organizations within the supply chain.

Concurrently, it is an object of the present invention to provide a learning system and related methods that reduces training costs. Such an aspect of the present invention reduces travel requirements and utilizes web-based delivery of live and recorded lectures to reduce the need for repetitive seminars.

Additionally, it is an object of the present invention to provide a learning system and related methods that provides a mechanism for personal instructor feedback in a distance-learning environment. Such aspects of a learning system include a coordinated means to talk remotely with instructors or team leaders.

Also, it is an object of the present invention to provide a learning system and related methods that utilize team projects and personal interaction. Such an aspect of the invention includes the use of audio/video conferencing and other distance learning techniques when geographical considerations preclude personal group meetings. Thus, actors in supply chain with similar learning needs can coordinate group efforts regardless of corporate affiliations or geographic location.

Furthermore, it is an object of the present invention to provide a learning system and related methods that provides an opportunity for community and an exchange of ideas among peers. Such an aspect of the invention includes the use of a blended learning approach that combines on-line simulations (for groups or individuals), self study web-based training modules (a computer-based training self-study), audio/video conference calls, team-oriented assignments, discussion threads for questions and answers, virtual lectures, and traditional seminars.

Still further, it is an object of the present invention to provide a learning system and related methods that can be hosted by a learning services provider and with customer accesses restricted by license agreements. Such a learning system and related methods can be tailored to the needs of individual customers. Customer accounts can be designed to accommodate core learning assets or additional licensed assets. Similarly, accounts can be structured to allow users access to learning assets on an individual tuition basis.

The effectiveness of a supply chain learning system (SCLS) according to the present invention is based on a combination of content, technology and methodology. The invention comprises a learning system and related methods that provide everything together in one place with regard to supply chain learning. The benefits of training are multiplied by providing a comprehensive learning system that makes available the resources to all participants of the supply chain, while allowing individual organizations to adapt, expand, or limit available learning options.

Additional features and advantages of the invention will be set forth in the description which follows, and in part will be apparent from the description, or maybe learned by practice of the invention. The objectives and other advantages of the invention will be realized and attained by the structure particularly pointed out in the written description and claims hereof as well as the appended drawings.

BRIEF DESCRIPTION OF THE DRAWINGS

FIG. 7 is a screen images that illustrates the initial Web page a user encounters after successfully logging in to the learning system portal according to an embodiment of the present invention.

FIG. 8 is a screen image that illustrates the search features within the learning system portal according to an embodiment of the present invention.

FIG. 9 is a screen image that illustrates a registration/information page for a specific course offered through the SCLS portal.

FIG. 12 is a screen image that illustrates a presentation of a general learning structure for supply chain oriented learning according to an embodiment of the present invention.

DETAILED DESCRIPTION OF THE PREFERRED EMBODIMENTS

Figure 1:
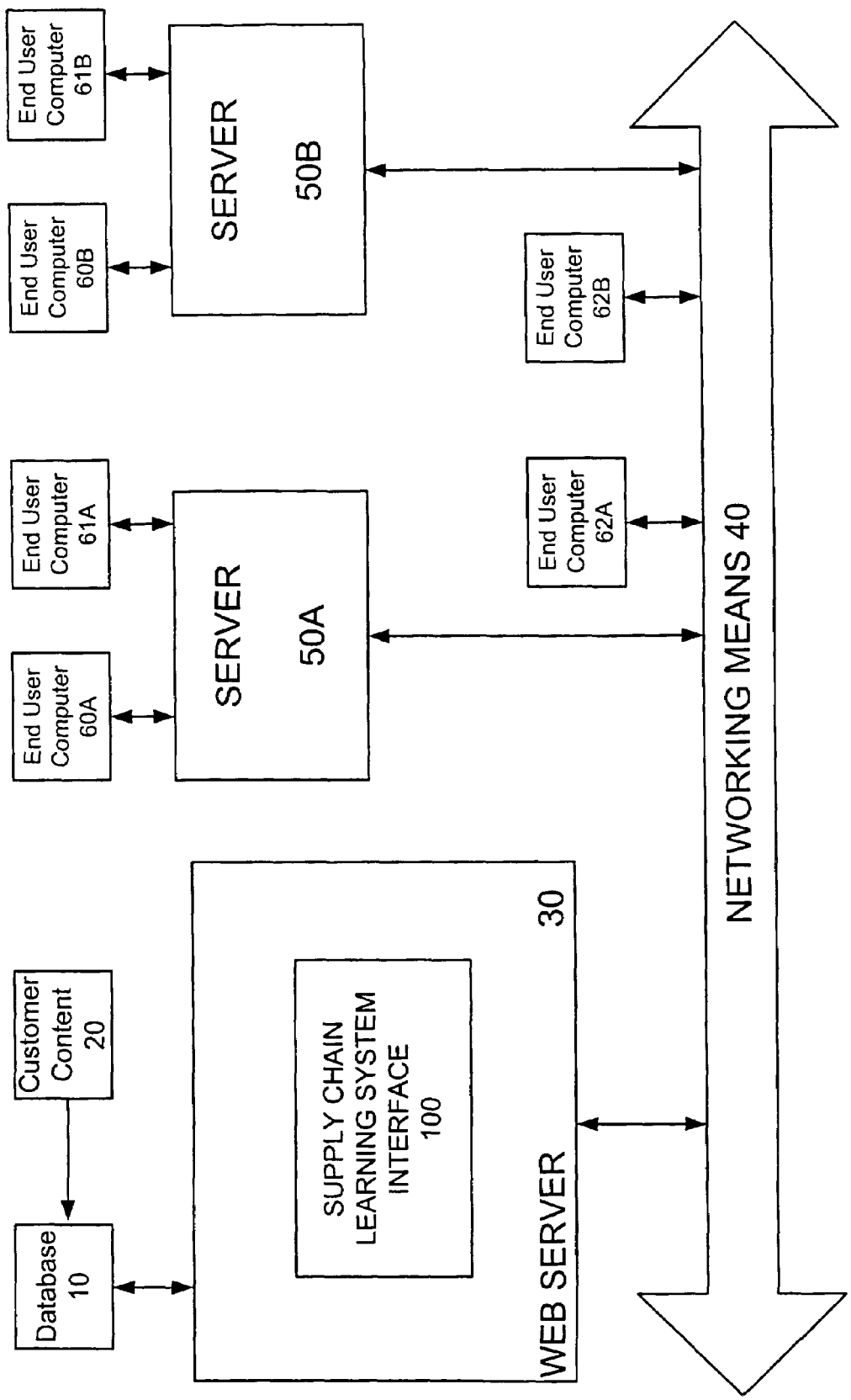
FIG. 1 is a schematic of a networking arrangement implementing the Supply Chain Learning System (SCLS).

FIG. 1 provides an example of the present invention as implemented on a typical Internet environment. The interface logic 100 for the Supply Chain Learning System (SCLS) is contained on a Web server 30 that is connected to other computers by networking means 40, such as the Internet, an intranet, or a local area network. The SCLS interface 100 is structured to receive requests from an end-user computer 60 or 62 for computer-based educational tools; to compile a personal profile for the user; and to monitor use of the computer-based, traditional, and distance learning educational tools. The term "computer" as used herein includes laptop computers, hand-held computers, computer workstations, main frames, personal digital assistants (PDAs), or other web-enabled devices. Generally, end users may access SCLS interface 100 directly through network connection 40 or indirectly through an end user's computer's local servers 50a or 50b. The number of end users of the SCLC is limited only by the capacity of the networking means 40 and Web server 30, respectively, or by a customer's license agreement. End user computers 60 and 62 provide user profile information and requests for educational material, either directly or indirectly, to SCLS interface 100. Educational content and user profiles are stored in a database 10 that is accessed according to the information provided by each of the end users. Upon a request from an end user computer, specific educational content is retrieved from database 10 and delivered via networking means 40, directly or indirectly through local server 50a or 50b, to the requesting end user computer.

Interface logic 100 supports hosting and delivery of computer based training (CBT) modules, recorded presentations, on-demand and live Web casts, on-line chat sessions, discussion forums, and various media playback formats. Files can be made available and transferred using, for example, hypertext markup language (html), various Web page creation software, Flash™ file format and Java™ technology, audio playback software, and video playback software. Access is obtained through a variety of user platforms including Microsoft® Internet Explorer™ and Netscape® Navigator™, or other Web browsers including publicly accessible Web browsers.

In a preferred embodiment, a third party learning services provider can host the present invention, with end user customer accesses to the educational materials in database 10 restricted by license agreements. In such an embodiment, the content that an end user can access through SCLS interface 100 can be tailored to the needs of individual users or user groups as determined by the licensing customer organization. Customer accounts can be designed to accommodate core learning assets or additional licensed assets. Similarly, accounts can be structured to allow end users access to learning assets beyond the customer's license agreement on an individual tuition basis, as shown below in FIG. 3. The educational content of database 10 may be supplemented for specific end users with additional content 20 provided by any licensing customer group.

Figure 2:
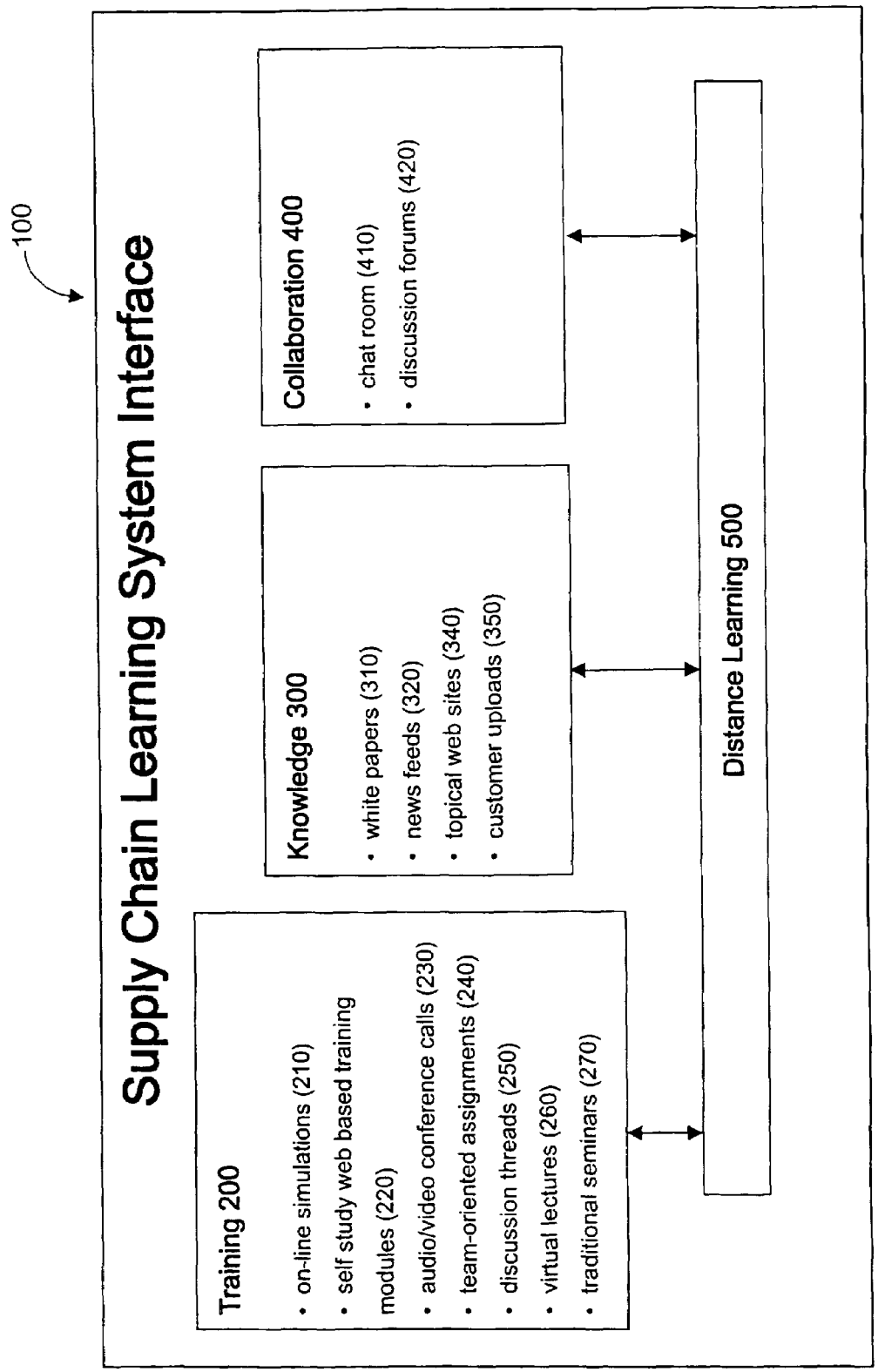
FIG. 2 identifies the main components of the SCLS.

As shown in FIG. 2, the SCLS 100 comprises four interrelated components—a training component 200, a knowledge component 300, a collaboration component 400, and a distance learning component 500—and combines a range of tools within these four components. The combination of tools includes computer-based educational tools, traditional learning educational tools, and distance learning educational tools and provides convenience, cost-effectiveness and a sense of community for the learning experience. Computer-based educational tools include those learning assets delivered from SCLS 100 to an end user's computer. Traditional learning educational tools include, for example, learning assets provided through personal or classroom instruction and team-oriented projects. Distance learning educational tools include, for example, pre-recorded audio/video media, telephone conferences, and mailed/faxed materials.

The blend of technology for training component 200 includes use of on-line simulations (for groups or individuals) 210, self study web-based training modules 220, audio/video conference calls 230, team-oriented assignments 240, discussion threads 250, virtual lectures 260, and traditional seminars 270. A preferred embodiment includes a comprehensive collection of web-based modules designed to build specific skills and knowledge. These modules provide structure for an overall training program by using compiled groups of topics ("learning series"). However, an organization can also customize the learning environment to emphasize particular needs or even eliminate access to particular courses or learning series. Also, the invention is structured to accommodate a broad range of education levels among targeted users. Thus, the content and delivery format must be tied appropriately to the target audience of each course.

On-line simulations 210 present learners with scenarios that are representative of experiences within the supply chain environment. These simulations can be tailored for groups or individuals and may require, for example, discussions, research, meetings or interviews that are conducted off-line. Self study web-based training modules 220 comprise a computer based training self-study that allows a user to work through a selected training area at the user's own schedule.

Conference calls 230, both audio and video, provide a means for interactive discussions among peers and with instructors when learning participants are not located in the same geographic area. Conference calls are especially effective when used for kick-off sessions for group projects and for providing instructor feedback.

Team-oriented assignments 240 provide a wide range of learning benefits well-known in the art. Use of the distance learning component tools eliminates geographical barriers typically associated with group projects and allows for more flexibility in the selection of participants. For example, senior supply managers in three different states may participate together in a group project; whereas prior learning systems would be limited to groups within the same geographic area, so that a group project would include possibly a senior manager and employees in other positions. Of course, where geographic location and personnel permit, team oriented assignments cam be conducted locally.

Discussion threads 250 provide series of questions (typically in conjunction with a previous case study or reading assignment) for an individual or team to answer to help assimilate the training materials. After completing assigned reading, a learner may access the discussion thread area on-line, review the questions and provide answers. In a group setting, the questions may require a collaborative effort.

Virtual lectures 260 provide an avenue for traditional instruction without the travel requirements or classroom restrictions. Lectures can be conducted, for example, as a live web-cast or recorded for viewing at the user's convenience. Recognizing the limits to the ability to simulate live interaction, traditional seminars 270 are included as an instructional tool where appropriate.

The knowledge component 300 includes access to white papers 310, news feeds 320, topical web sites 340, and customer uploads 350 relevant to supply chain management. These knowledge tools can be made available to the learner on demand. The knowledge component can be incorporated into part of a particular training curriculum or it can be used as a continuing education aspect of the invention.

The collaboration component 400 provides a forum for discussion among peers and experts within the supply chain field that help to build community among participants. For example, a chat room 410 is used to allow for a continuous environment for participants in the supply chain to exchange ideas and ask questions of peers. Additionally, discussion forums 420 are used to provide a scheduled environment to discuss issues with experts and peers alike. Discussion forums may be conducted on-line or in a traditional live stetting.

Distance learning component 500 overlaps with and enables the other SCLS components. This component includes capabilities such as live web casts audio conferences, and video conferences. Also, the SCLS interface can be used to host events, record them, and make them available electronically as part of a training program or knowledge tool.

Another feature of the SCLS generally includes the ability to customize the content (by company, group, region, etc.) available to the end user. A licensing organization may choose to restrict access to that learning content which specifically aligns with the organization's involvement in the supply chain.

The supply chain management e-course provides a specific embodiment of the invention that utilizes most aspects of the SCLS. The e-course modifies a typical short-term (approximately 1 day, or up to a few weeks) classroom course into a course that attends to the same learning aspects in discrete increments over several weeks or months. Traditional educational methods such as lectures, case studies, group projects, and discussion groups are incorporated into a blended learning approach that allows for distance learning while maintaining the personal interaction and community of the traditional format. The e-course exemplifies the SCLS method with a blend of self-study, conferences, individual tasks, on-line training, group projects, web casts and personal feedback. Referring back to FIG. 1, end users (students) create a user profile and access SCLS interface 100 for delivery of course materials, conducting computer-based training, accessing course schedules, participating in Web casts or discussion groups, and reporting task progress. The end user's progress through the e-course is recorded in the respective user profile and stored in database 10 for later retrieval. Benefits of the e-course include lower costs and greater retention compared to traditional short-term courses, the convenience and flexibility of distance learning, the community of traditional learning, and reduced disruption of the workforce.

Figure 4:
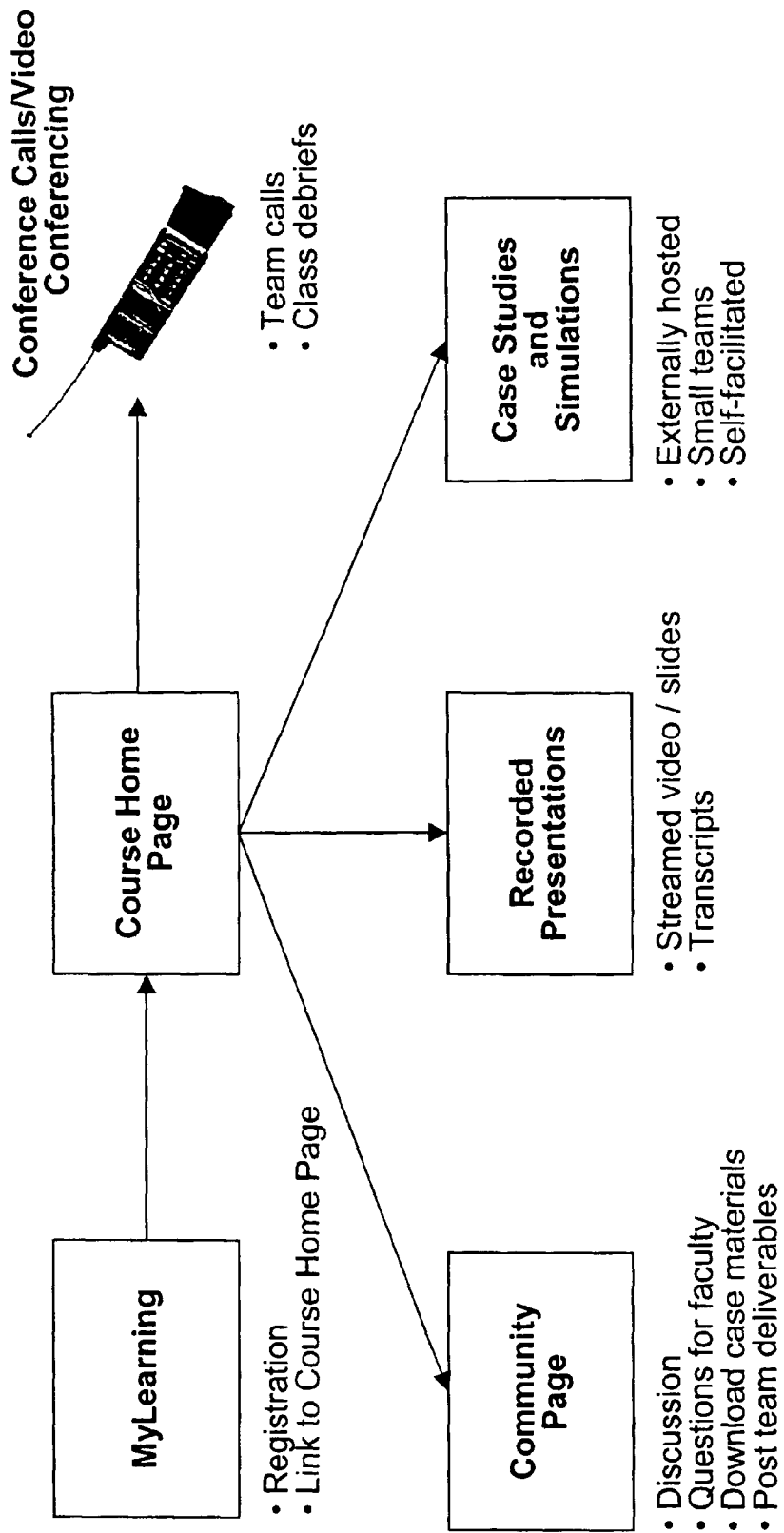
FIG. 4 diagrams the interaction of various components of the present invention as utilized in a particular course utilizing a blended learning approach.
Figure 5:
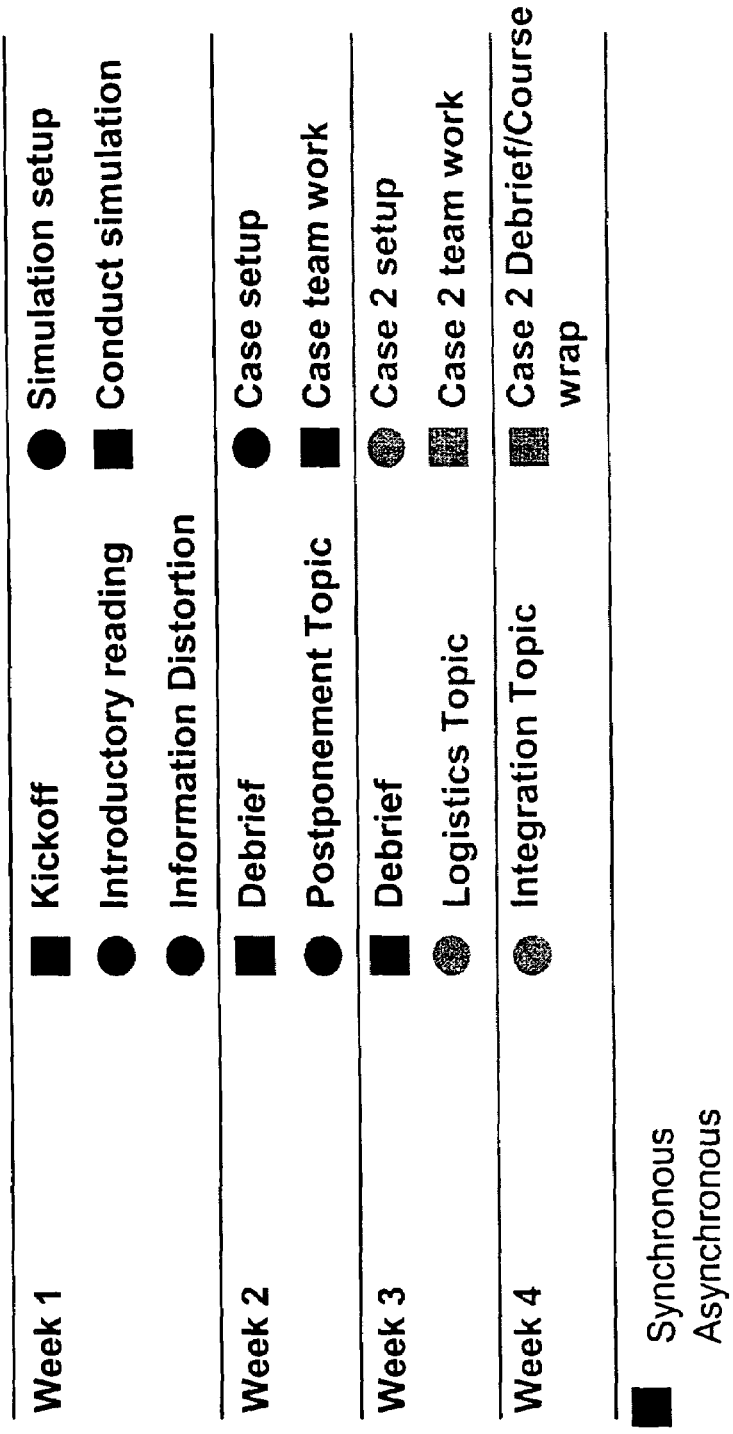
FIG. 5 is a chart depicting the combination of synchronous and asynchronous modules of a particular course utilizing a blended learning approach.

An example of the blended learning approach used in the e-course is shown in FIG. 4. Course registration is conducted by logging in to SCLS interface 100 (FIG. 1) with the appropriate user profile and selecting the desired course. Access to the course schedule and materials is provided on a course home page. Through the course home page, students access a series of scheduled and unscheduled discussions, presentations in various formats, and reading materials. Students also post deliverables and assignments for access by other students and/or the course instructor. Group projects are organized and tracked on the home page, but the logistics for each individual group are arranged separately. Thus, the e-course includes a combination of scheduled (synchronous) and unscheduled (asynchronous) elements, as shown in FIG. 5. As an example, the course could begin with a live (or live Web cast or live audio conference call) kickoff session that requires the simultaneous attendance by every class member. Each student can conduct subsequent reading, complete assignments, or view lectures separately within a set time period to be followed by a scheduled class debrief via Web cast or conference call. In addition to individual and class activities, students are assigned into teams for the purpose of conducting simulations and/or case studies. Team projects are conducted individually (i.e., individual preparation), as a team (i.e., group preparation), and with the entire class (i.e., formal presentations). Completion of individual assignments, "attendance" at Web casts, team assignments, and other class participation metrics are recorded as part of each student's user profile.

The learning system of the present invention allows members of the same organization—or members of different organizations within the supply chain that have similar learning needs—to participate in the same course regardless of each member's geographic location. The use of distance learning tools reduces costs and travel commitments that might otherwise prevent or limit participation. The course format allows for the possibility of larger class sizes than traditional interactive seminars; or, alternatively, specific learning groups can be formed that would not be feasible. For example, in a case where a transportation specialist has learning needs distinct from other workers within his organization, he can be grouped in a learning team with transportation specialists from other organizations. Thus, participants receive an educational benefit not only from the course content, but also from the collective insights of similarly-situated actors in the supply chain.

Figure 3:
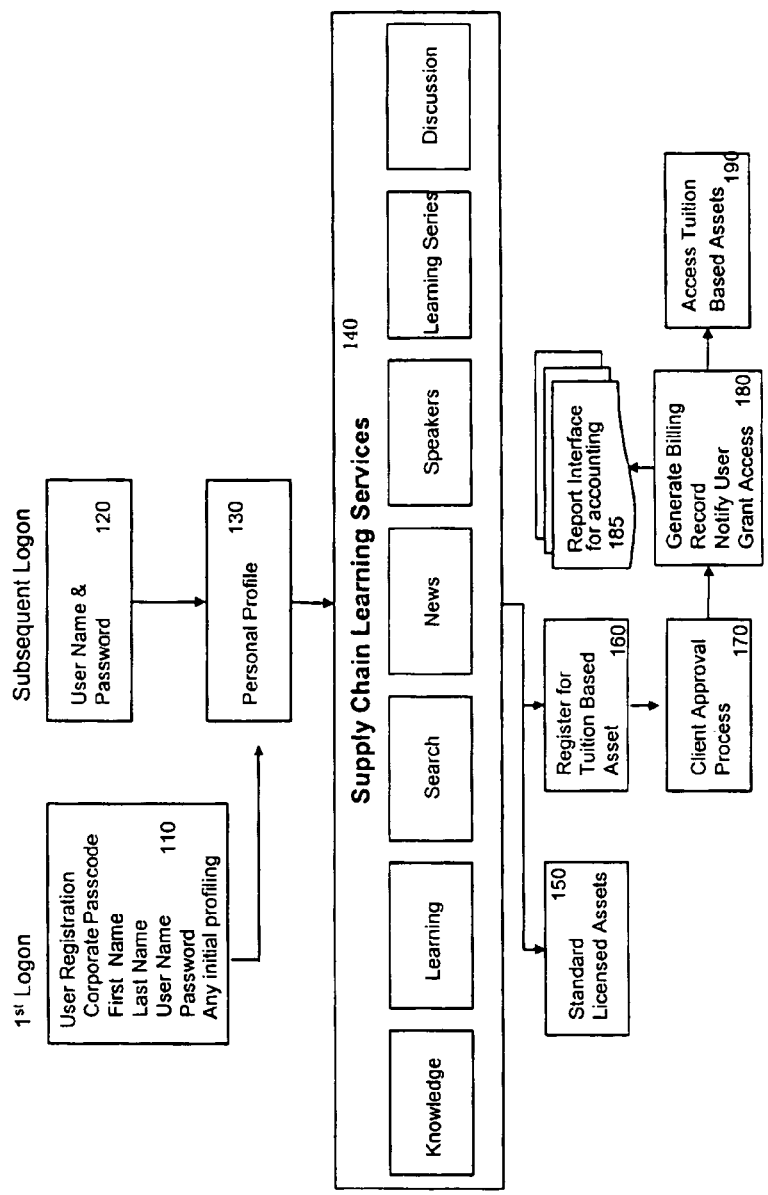
FIG. 3 illustrates the approval process for a typical system upon which the SCLS may be implemented.

FIG. 3 illustrates the approval process for a typical system upon which SCLS 100 may be implemented. The system may be implemented as an internet-based model or within other mediums, such as a local area network. The user goes through an initial logon process 110 that identifies the appropriate corporate identity and collects basic profile information for the user. The personal profile 130 is then created and updated as the user creates preferences while using the system. For subsequent use after the initial logon, the user provides a username and password from the user's profile in accordance with subsequent logon process 120, before proceeding to personal profile 130. One embodiment of the invention includes the ability of the SCLS interface to interact with a customer's own learning management system to track enrollment and course completion. Reports for individual system users or groups of users can be made available to, for example, a licensing corporation for the purpose of tracking that corporation's employee training progress. Alternatively, the SCLS can act in a limited capacity as a stand-alone learning management system, collecting real-time course registration/enrollment data, course completion, and completion of traditional and distance learning activities.

Under the identified personal profile 130 of FIG. 3, the user then accesses the SCLS portal 140 that contains training materials, a knowledge materials, collaborative resources, distance learning tools, and searching capabilities customized to that personal profile. SCLS portal 140 can be customized according to user profile information that may incorporate user-specific preferences as well as preferences that may be defined under a group license of which the user is a member. For example, when a user accesses the portal's homepage through the above-described logon process, the homepage may display news and announcements specific to the user's group or corporate entity. Listings with links to recently completed, current, and scheduled learning activities for the specific user may also be displayed. The portal homepage display can similarly be customized to contain links only to the features identified by the user's license agreement, selected, for example, from the group of options within the training 200, knowledge 300, collaboration 400, and distance learning 500 components described in FIG. 2. Furthermore, the portal homepage display can be customized by providing a user with access to some, none, or all of the available learning series and the associated components necessary to complete the accessible learning series. In some embodiments, the portal homepage can include a link to the user's learning management information 140 (FIG. 3).

Also within the customized portal 140 is the option to access additional learning assets. Standard licensed assets 150 are accessible when included as part of the corporate identity created during initial logon 110. Additionally, tuition-based assets 190 may be accessed by having the user complete registration process 160 and then receiving approval from the user's company in client approval process 170. Once approval process 170 is completed, process 180 generates a billing record for the user that is reported to the service provider's accounting department for client billing 185. The user is then granted access to the tuition based learning assets 190.

Figure 6:
FIG. 6 is a screen image that illustrates a Web-based login page according to an embodiment of the present invention.

Examples of a user interface for Web-based embodiments according to the present invention are contained in FIGS. 6 through 11. FIG. 6 shows a login page. In accordance with subsequent login process 120 (FIG. 3), prior users or those who have been registered through a corporate license may enter their registered username an password in the spaces provided to gain access to SCLS portal 140 (FIG. 3).

FIG. 7 is an example of a welcome page for a typical registered user seen after a successful login. The "My Learning Assets" heading provides user-specific links to that user's currently registered coursework and other learning materials. The listed course include embedded links to the respective course homepage. The "My Scheduled Events" heading provides user-specific links to upcoming courses, presentations and other assets for which the user has already registered. Links to other components of the SCLS portal are included on the right side of the screen. Information specific to a user's organization or information about the learning portal can also be displayed on the welcome page.

The "Find Learning Assets" link in FIG. 7 provides access to search capabilities of SCLC portal 140, as shown in FIG. 8. In FIG. 8, a topical search was conducted for the term transportation, with a portion of the search results shown. Searches may also be conducted by other criteria using means known in the art. The search results list course titles with links to each respective course's information/registration page. FIG. 9 shows an example of an information/registration page. Also listed with the search results is basic descriptive information about the course including the time required, the type of training each course involves (i.e., online self-study, expert on-demand, workshop, e-course, expert audio/web conference, discussion forum, workshop, or other self-study materials), and whether the course is part of the generally licensed package or a tuition-based asset.

Figure 10:
FIG. 10 is a screen image that illustrates the options available in the knowledge component of the learning system portal according to an embodiment of the present invention.

The "knowledge" link in FIG. 7 provides access to the knowledge component of the SCLS portal 140, as shown in FIG. 10. The page includes links to topical news groups, white papers, and Web sites that may be more timely than, or a supplement to, the course content in the SCLS.

Figure 11:
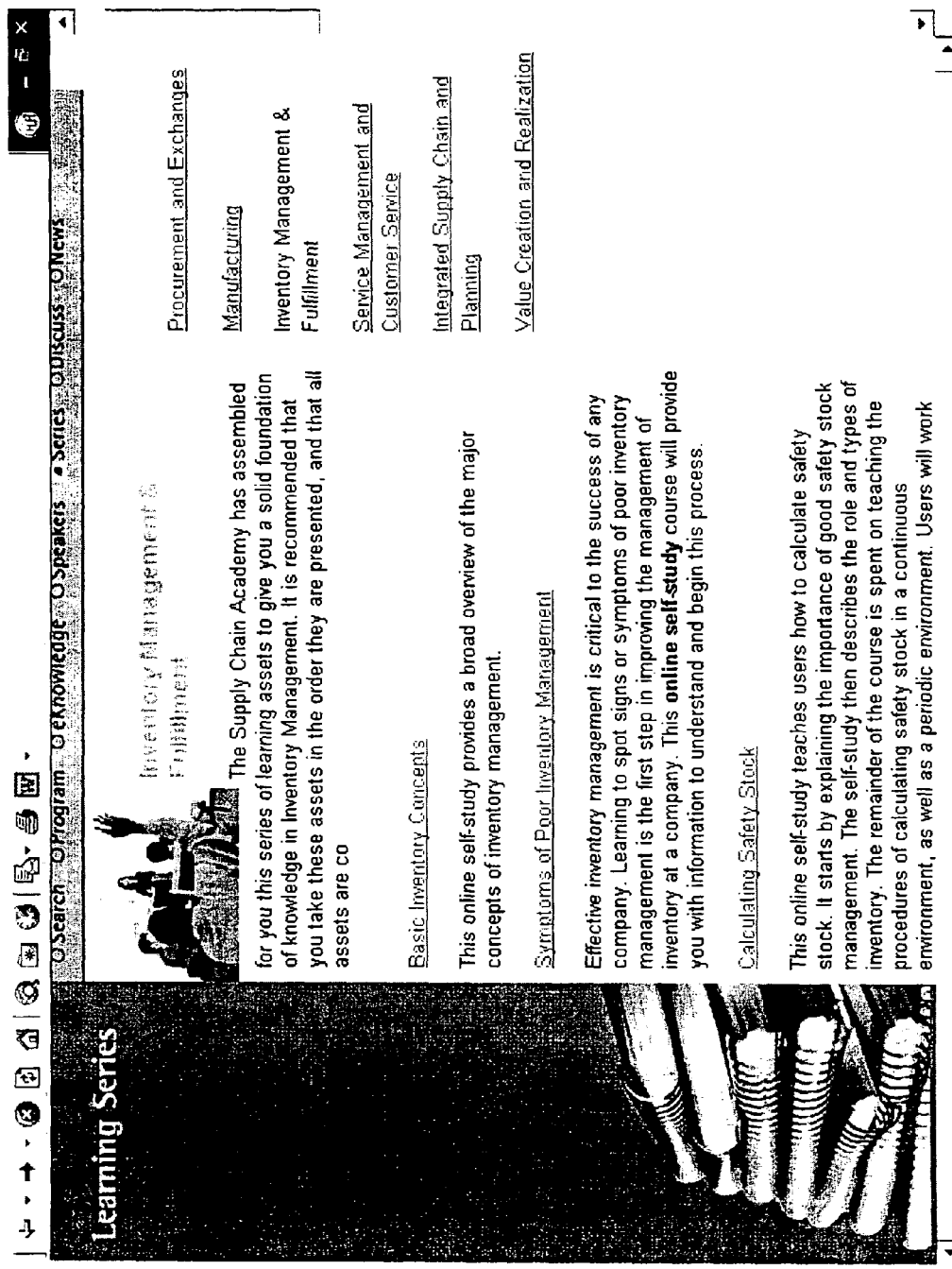
FIG. 11 is a screen image that illustrates the presentation of learning series options available in an embodiment of the present invention.

The "Learning Series" link in FIG. 7 provides access to descriptions of a variety of structured topical series. FIG. 11 provides an example of a particular learning series, "Inventory Management & Fulfillment," with a partial list of representative course that make up that particular learning series. Each listed course includes a link to a course information/registration page and a short course description. Links to other learning series are included on the right hand side of the screen. Similarly, the "Supply Chain Education Program" link in FIG. 7 provides access to an SCLS program framework, as shown in FIG. 12. The available learning assets within the SCLS are grouped into one of (for example) three categories to help structure a user's learning environment.

While exemplary embodiments of the invention have been shown and described herein, it will be obvious to those skilled in the art such embodiments are provided by way of example only. Numerous insubstantial variations, changes, and substitutions will now be apparent to those skilled in the art without departing from the scope of the invention disclosed herein by the Applicants. Accordingly, it is intended that the invention be limited only by the spirit and scope by the claims as they will be allowed.

What is claimed is:

1. A learning system for providing educational content related to a supply chain, wherein said supply chain comprises a plurality of logistical stages comprising materials procurement, production, storage, distribution, and customer service, the learning system comprising:

a network, including an educational content server, a plurality of end-user computers, and a communication means connecting the educational content server to the plurality of end-user computers;

wherein said educational content server comprises i. educational content modules including a knowledge database, a collaboration module, a training module, and a distance learning module, wherein the educational content modules provide content, where content is classified as either individual content or group content, wherein each of the content is linked with at least one of the logistical stages;

ii. a content database, wherein the content database comprises (a) an index of each of the content available through the educational content modules, and (b) a content record coupled to each of said content, wherein each of the content records indicates the one or more logistical stages linked to the coupled content;

iii. a company registration module that allows a company to create a company profile, the company profile identifying a company set of content;

iv. a user registration module that allows an employee of the company to create a user profile, the user profile including (a) information associating the employee with one or more of the logistical stages and (b) a history of the employee receiving content from the content database; and v. a supply chain learning system interface (SCLSI) providing at least the functions of:

(1) presenting a list of available content to the employee, where the list of available content identifies the content linked in the content database to the one or more logistical stages associated with the employee in the user profile;

(2) allowing the employee to select content from the list of the available content that is also identified in the company set-of content as stored in the company profile;

(3) allowing the employee to request tuition-based content, where the tuition-based content is identified in the list of available content but is not identified in the company set of content, where the employee's request is sent to the company for approval, and where the user is served the requested tuition-based content only if the company approves the request; and (4) delivering selected and approved content to the user from the educational content modules as specified by the content record in the content database, where individual content is delivered asynchronously and group content is delivered synchronously to a group of users.

2. The learning system of claim 1, wherein the collaboration module provides real-time chat and on-line discussion forums.

3. The learning system of claim 1, wherein the training module content includes on-line simulations, self-study web-based training modules, scheduled audio/video conference calls, team-oriented assignments, discussion threads, virtual lectures, and traditional seminars.

4. The learning system of claim 1, wherein the knowledge database content includes white papers, news feeds, links to topical web sites, and content uploaded by users.

5. The learning system of claim 1, wherein the distance learning module provides pre-recorded audio and video media, telephone conferences, e-mailed materials, and faxed materials.

6. The learning system of claim 1, wherein the user profile includes the user's job designation, geographic location, and education level.

7. The learning system of claim 6, wherein the company profile includes the at least one supply-chain function that the company provides to its customers.

8. The learning system of claim 7, wherein the appropriate user type for content is defined by at least one of: the company employing the user, the at least one supply-chain function of the company, job designation, geographic location, and educational level.

9. The learning system of claim 1, wherein the list of available content does not include content previously completed by the user as stored in the user's user profile.

10. A method for providing educational content related to a supply chain, wherein said supply chain comprises a plurality of logistical stages comprising materials procurement, production, storage, distribution, and customer service, the method comprising the steps of:

supplying content from educational content modules including a knowledge database, a collaboration module, a training module, and a distance learning module, where content is classified as either individual content or group content, and where said educational content modules are hosted on an educational content server, wherein the content is linked with at least one of the logistical stages;

storing in a content database a list of all content available through the educational content modules, and content records indicating the logistical stages linked to each of the content;

registering a company with the educational content server, where a company registers by creating a company profile, the company profile including a company's set of content from the content database;

registering employees of the company as users of the educational content server, where each of the employee registers by creating a user profile, the user profile associating one of the employees with one or more of the logistical stages and that employee's history of receiving content from the content database; and providing access to the supply-chain related educational content by a method comprising:

(1) presenting a list of available content to a user, where the list includes only content linked to the logistical stages associated with the user in the user profile (2) allowing the user to select content from the list that is also contained in the company's set of content as stored in the company's company profile;

(3) allowing the user to request tuition-based content from the list, where the tuition-based content is not contained in the company's set of content, where the request is sent to the company for approval, and where the user is served the requested content only if the company approves the request; and (4) delivering selected and approved content to the user from the educational content modules as specified by the content record in the content database, where individual content is delivered asynchronously and group content is delivered synchronously to a group of users.

11. The method of claim 10, wherein the collaboration module provides real-time chat and on-line discussion forums.

12. The method of claim 10, wherein the training module content includes on-line simulations, self-study web-based training modules, scheduled audio/video conference calls, team-oriented assignments, discussion threads, virtual lectures, and traditional seminars.

13. The method of claim 10, wherein the knowledge database content includes white papers, news feeds, links to topical web sites, and content uploaded by users.

14. The method of claim 10, wherein the distance learning module provides pre-recorded audio and video media, telephone conferences, e-mailed materials, and faxed materials.

15. The method of claim 10, wherein the user profile includes the user's job designation, geographic location, and education level.

16. The method of claim 15, wherein the company profile includes the at least one supply-chain function that the company provides to its customers.

17. The method of claim 16, wherein the appropriate user type for content is defined by at least one of: the company employing the user, the at least one supply-chain function of the company, job designation, geographic location, and educational level.

18. The method of claim 10, wherein the list of available content does not include content previously completed by the user as stored in the user's user profile.

19. A computer-executable medium for implementing a set of steps in a method for providing educational content related to a supply chain, wherein said supply chain comprises a plurality of logistical stages comprising materials procurement, production, storage, distribution, and customer service, the method comprising the steps of:

supplying content from educational content modules including a knowledge database, a collaboration module, a training module, and a distance learning module, where content is classified as either individual content or group content, and where said educational content modules are hosted on an educational content server, wherein the content is linked with at least one of the logistical stages;

storing in a content database a list of all content available through the educational content modules, and content records indicating the logistical stages linked to each of the content;

registering a company with the educational content server, where a company registers by creating a company profile, the company profile including a company's set of content from the content database;

registering employees of the company as users of the educational content server, where each of the employee registers by creating a user profile, the user profile associating one of the employees with one or more of the logistical stages and that employee's history of receiving content from the content database; and providing access to the supply-chain related educational content by a method comprising:
(1) presenting a list of available content to a user, where the list includes only content linked to the logistical stages associated with the user in the user profile
(2) allowing the user to select content from the list that is also contained in the company's set of content as stored in the company's company profile;
(3) allowing the user to request tuition-based content from the list, where the tuition-based content is not contained in the company's set of content, where the request is sent to the company for approval, and where the user is served the requested content only if the company approves the request; and
(4) delivering selected and approved content to the user from the educational content modules as specified by the content record in the content database, where individual content is delivered a synchronously and group content is delivered synchronously to a group of users.

* * * * *